US008923093B2

United States Patent
Scott et al.

(10) Patent No.: US 8,923,093 B2
(45) Date of Patent: Dec. 30, 2014

(54) DETERMINING THE QUALITY OF A SEISMIC INVERSION

(75) Inventors: Ian Richard Scott, Guildford (GB); Mark Wheeler, Crowborough (GB)

(73) Assignee: WesternGeco L.L.C., Houston, TX (US)

( * ) Notice: Subject to any disclaimer, the term of this patent is extended or adjusted under 35 U.S.C. 154(b) by 1001 days.

(21) Appl. No.: 12/730,980

(22) Filed: Mar. 24, 2010

(65) Prior Publication Data
US 2011/0051553 A1 Mar. 3, 2011

Related U.S. Application Data (60) Provisional application No. 61/236,807, filed on Aug. 25, 2009.

(51) Int. Cl.
*G01V 1/00* (2006.01)
*G01V 1/28* (2006.01)

(52) U.S. Cl.
CPC ............ *G01V 1/282* (2013.01); *G01V 2200/14* (2013.01)
USPC .......................................................... 367/38

(58) Field of Classification Search
CPC ........................... G01V 1/282; G01V 2200/14
USPC .......... 367/31, 38, 73, 83, 25, 50, 53; 702/13, 702/17, 85, 6, 14, 16; 166/369; 703/5
See application file for complete search history.

(56) References Cited

U.S. PATENT DOCUMENTS 5,583,825 A * 12/1996 Carrazzone et al. ............ 367/31
7,791,981 B2 * 9/2010 Kiyashchenko et al. ....... 367/73

FOREIGN PATENT DOCUMENTS

WO 2008154640 A1 12/2008
WO WO 2009088602 A1 * 7/2009 ............... G01V 1/28

OTHER PUBLICATIONS

White, Partial Coherence Matching of Synthetic Seismograms with Seismic Traces, Geophysical Prospecting, 1980, pp. 333-358, vol. 28, Issue 3.
Wiener, Generalized Harmonic Analysis, Carta Matematica, Dec. 1930, pp. 117-258, vol. 51, No. 1.

* cited by examiner

*Primary Examiner* — Daniel L Murphy
(74) *Attorney, Agent, or Firm* — Gary Gex (57) ABSTRACT

A method for evaluating a quality of a seismic inversion. The method includes performing a first match between seismic data and borehole seismic data at one or more borehole locations to generate an estimate of a wavelet in the seismic data. The method then performs a seismic inversion on the seismic data using the estimate of the wavelet to generate inverted seismic data. After performing the seismic inversion, the method converts the inverted seismic data into one or more reflectivity traces. The method then includes performing a second match between the one or more reflectivity traces and one or more traces in the seismic data and performing a third match between the one or more reflectivity traces and one or more traces in the borehole seismic data. After performing the second and third matches, the method determines the quality of the seismic inversion based on the first match, the second match, the third match or combinations thereof.

21 Claims, 4 Drawing Sheets

DETERMINING THE QUALITY OF A SEISMIC INVERSION

CROSS-REFERENCE TO RELATED APPLICATIONS

This application claims benefit of U.S. provisional patent application Ser. No. 61/236,807, filed Aug. 25, 2009, which is incorporated herein by reference.

BACKGROUND

1. Field of the Invention

Implementations of various technologies described herein generally relate to seismic data processing.

2. Discussion of the Related Art

This section is intended to provide background information to facilitate a better understanding of various technologies described herein. As the section's title implies, this is a discussion of related art. That such art is related in no way implies that it is prior art. The related art may or may not be prior art. It should therefore be understood that the statements in this section are to be read in this light, and not as admissions of prior art.

Seismic exploration is widely used to locate and/or survey subterranean geological formations for hydrocarbon deposits. Since many commercially valuable hydrocarbon deposits are located beneath areas of land and bodies of water, various types of land and marine seismic surveys have been developed.

In a typical land or marine seismic survey, seismic receivers are installed in specific locations around an area of the earth in which hydrocarbon deposits may exist. Seismic sources, such as vibrators or air guns, may move across the area and produce acoustic signals, commonly referred to as "shots," directed down to the earth, where they are reflected from the various subterranean geological formations. Reflected signals are received by the sensors, digitized, and then transmitted to a survey database. The digitized signals are referred to as seismic data. The ultimate aim of this process is to build a representation of the subterranean geological formations beneath the surface of the earth. Analysis of the representation may indicate probable locations of hydrocarbon deposits in the subterranean geological formations.

Seismic inversion is the process of transforming seismic data into a quantitative rock property description of the subterranean geological formations beneath the surface of the earth. As such, seismic inversion models fundamental rock properties from pre-stack or post-stack seismic data, such as acoustic impedance. These fundamental rock properties from the seismic data are used to create a description of hydrocarbon deposits in the subterranean geological formations, such as reservoirs. This description is then used to model hydrocarbon production and estimate reserves.

SUMMARY

Described herein are implementations of various technologies for determining the quality of a seismic inversion. In one implementation, a method for evaluating a quality of a seismic inversion may include performing a first match between seismic data and borehole seismic data at one or more borehole locations to generate an estimate of a wavelet in the seismic data. The method may then perform a seismic inversion on the seismic data using the estimate of the wavelet to generate inverted seismic data. After performing the seismic inversion, the method may include converting the inverted seismic data into one or more reflectivity traces. The method may then include performing a second match between the one or more reflectivity traces and one or more traces in the seismic data and performing a third match between the one or more reflectivity traces and one or more traces in the borehole seismic data. After performing the second and third matches, the method may determine the quality of the seismic inversion based on the first match, the second match, the third match or combinations thereof.

In another implementation, the method for evaluating the quality of a seismic inversion may include processing seismic data in preparation for the seismic inversion and then performing a first match between the processed seismic data and borehole seismic data at one or more borehole locations to estimate one or more wavelets that are embedded in the processed seismic data. The method may then include performing the seismic inversion on the seismic data using the wavelets to generate inverted seismic data and converting the inverted seismic data into one or more reflectivity traces. After converting the inverted seismic data, the method may perform a second match between the one or more reflectivity traces and one or more traces in the seismic data and perform a third match between the one or more reflectivity traces and one or more traces in the borehole seismic data. The method may then include determining the quality of the seismic inversion based on the first match, the second match, the third match or combinations thereof.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at determining the quality of a seismic inversion. In one implementation, a method for determining the quality of a seismic inversion may be performed by a computer application. Initially, the computer application may receive seismic data that was acquired from a seismic survey. The computer application may also receive measured seismic data at a borehole location. In one implementation, the computer application may process the acquired seismic data processed such that the acquired seismic data is represented as migrated dataset of seismic data in the time domain or in the depth domain.

The computer application may then match the processed seismic data with the measured borehole seismic data, including logs and Vertical Seismic Profiles (VSPs) at the borehole location using a borehole matching technique. The borehole matching technique determines a quality of the match between the processed seismic data and the measured borehole seismic data. Additionally, the borehole matching technique estimates a wavelet that is embedded in the processed seismic data.

After estimating the wavelet embedded in the processed seismic data, the computer application may then perform a seismic inversion on the processed seismic data using an inversion algorithm. In one implementation, the seismic inversion may remove the wavelet from the processed seismic data and create a model of the earth in terms of impedance, density, velocity, or the like. The model of the earth may describe the rock properties of the earth at the borehole location.

After creating the model of the earth, the computer application may convert the model of the earth into a series of reflectivity traces. Since the series of reflectivity traces are in the same format as the measured borehole seismic data and the processed seismic data, the computer application may compare the series of reflectivity traces with the measured borehole seismic data and the processed seismic data to determine the quality of the seismic inversion. For instance, the computer application may match the series of reflectivity traces to the reflectivity traces of the measured borehole seismic data to determine how well the series of reflectivity traces modeled the reflectivity traces of the borehole seismic data. The computer application may then match the series of reflectivity traces to the input traces of the processed seismic data to determine how well the wavelet was removed from the model of the earth on a trace by trace basis.

Using the results of the matching between the series of reflectivity traces and the reflectivity traces of the measured borehole seismic data, the matching between the series of reflectivity traces and the input traces of the processed seismic data, and the borehole matching between the processed seismic data and the measured borehole seismic data, the computer application may evaluate the quality of the seismic inversion. In one implementation, the results of the above matchings may be evaluated using plots, quantification algorithms or the like.

The computer application may then determine whether the seismic inversion has been optimized based on the determined quality. In one implementation, if the computer application determines that the seismic inversion has not been optimized, the computer application may modify one or more inversion parameters in the inversion algorithm, modify one or more parameters of the seismic processing and perform the above steps again in order to optimize the quality of the seismic inversion. Using the determined quality of the seismic inversion for different parameters, the computer application may provide a predictability versus frequency curve for each seismic inversion performed with different parameters.

Various techniques for determining the quality of a seismic inversion will now be described in more detail with reference to FIGS. 1-4 in the following paragraphs.

Figure 1:
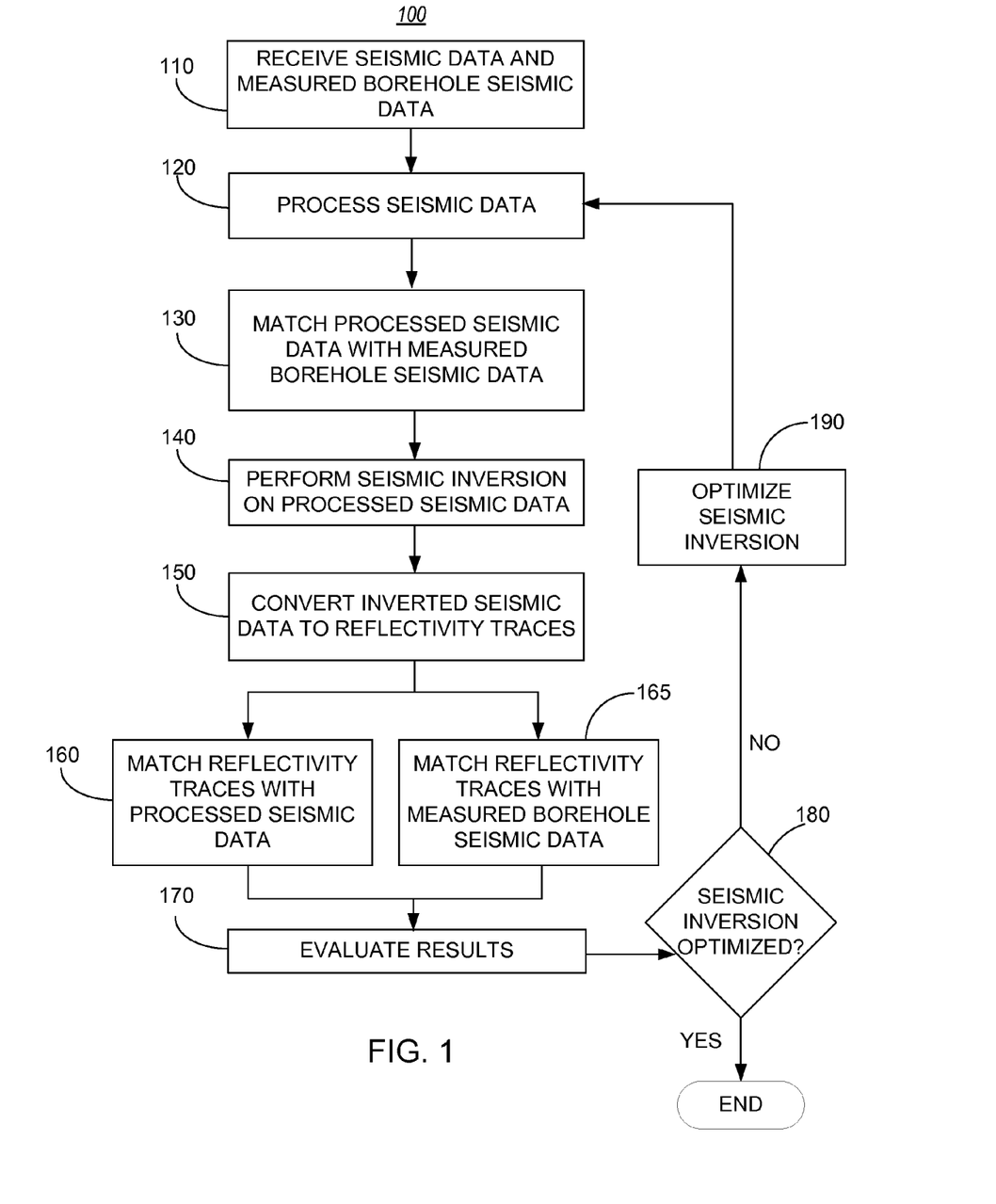
FIG. 1 illustrates a flow diagram of a method for determining the quality of a seismic inversion in accordance with implementations of various techniques described herein.

FIG. 1 illustrates a flow diagram of a method for determining the quality of a seismic inversion in accordance with implementations of various techniques described herein. In one implementation, the method for determining the quality of a seismic inversion may be performed by a computer application. It should be understood that while the flow diagram 100 indicates a particular order of execution of the operations, in some implementations, certain portions of the operations might be executed in a different order.

At step 110, the computer application may receive acquired seismic data and measured borehole seismic data. The acquired seismic data may have been acquired during a land or marine seismic survey by one or more seismic receivers. The measured borehole seismic data may have been acquired from a well logging device, Vertical Seismic Profiles (VSPs), or the like at one or more borehole locations.

At step 120, the computer application may process the acquired seismic data such that it is represented as a migrated dataset of seismic data in the time domain or in the depth domain. The migrated dataset may represent pre-stack or post-stack seismic data. In one implementation, processing the acquired seismic data may include applying seismic data processing pre-conditioning algorithms such as noise attenuation, deconvolution, filtering, normal moveout correction, demultiple, migration and the like to the acquired seismic data. Although step 120 recites processing the acquired seismic data, in some implementations the computer application may also process or condition the measured borehole seismic data by performing Vertical Seismic Profile (VSP) processing and conditioning or well log synthetic generation through log calibration. It should also be noted that step 120 is optional and is not required to perform method 100.

At step 130, the computer application may match the processed seismic data with the borehole seismic data at each borehole location using a borehole matching technique. Borehole matching techniques may establish a good well tie between the processed seismic data and the measured borehole seismic data. The tie between the processed seismic data and the measured borehole seismic data may establish an optimum spatial and temporal match position for the processed seismic data and the measured borehole seismic data. In one implementation, the borehole matching techniques may assess the relatedness of the portion of the processed seismic data with respect to the measured borehole seismic data to quantify the match between the processed seismic data and the measured borehole seismic data.

In addition to quantifying the match between the processed seismic data and the measured borehole seismic data, borehole matching techniques may also estimate a wavelet that is embedded in the processed seismic data. The estimated wavelet is typically a one-dimensional pulse that is the basic response received by seismic receivers from a single reflector in the Earth and includes waves that are created by seismic sources. By matching the processed seismic data with the borehole seismic data at each borehole location, the computer application may identify a portion of the processed seismic data that represents the seismic data measured at each borehole location and match this portion of the processed seismic data with the borehole seismic data to generate estimated wavelets in the portion of the processed seismic data. As such, the computer application may identify an estimated wavelet at each borehole location. The computer application may remove the estimated wavelets from the processed seismic data during the seismic inversion process described in step 140 below to create an accurate model of the Earth.

At step 140, the computer application may perform a seismic inversion on the processed data using an inversion algorithm. The seismic inversion may be pre- or post-stack, deterministic, stochastic, geostatistical or the like. Seismic inversion may remove the effects of a wavelet from the processed seismic data to create a model of rock properties of the earth (i.e., model of the earth) in terms of impedance, density, velocity, or the like. By removing the wavelet from the processed seismic data, the seismic inversion creates a higher resolution of the model of the earth representing the subterranean formations of the earth. Examples of seismic inversion may include sparse-spike inversion, coloured inversion, model-based acoustic impedance inversion, simultaneous poststack and prestack AVO inversion and the like. In one implementation, the seismic inversion may include various parameters that may be modified to improve the quality of the seismic inversion.

Before performing the seismic inversion, the computer application may prepare or condition the processed seismic data for the seismic inversion. In one implementation, conditioning the seismic data may include determining a single wavelet in the processed seismic data from the estimated wavelets in the portion of the processed seismic data described above. For example, the computer application may determine the average wavelet of the processed seismic data at each borehole location. In another implementation, conditioning the seismic data may include removing the varying phase of the wavelet so that all the wavelets on all the traces are the same zero-phase wavelet. For instance, the spectral amplitude of each trace may be normalized to a common spectrum derived from the signal and noise analysis of the processed seismic data. This conditioning may be done using space-adaptive wavelet equalization analysis. In yet another implementation, the computer application may add a low frequency model of the seismic survey area for one or more earth properties that may be derived from the seismic inversion process in order to compensate for the lack of low frequency information in the processed seismic data.

At step 150, the computer application may convert the model of the earth into a series of reflectivity traces such that the model of the earth is represented in the same format as the processed seismic data and the measured borehole seismic data.

At step 160, the computer application may match the series of reflectivity traces with the input traces of the processed seismic data. The input traces of the processed seismic data refer to the reflectivity traces of the processed seismic data or the processed seismic data output from step 120 before it has gone through the seismic inversion. By matching the series of reflectivity traces of the model of the earth to the input traces of the processed seismic data, the computer application may determine how well the wavelet was removed from the reflectivity traces of the model of the earth on a trace by trace basis. If the seismic inversion has been performed optimally, the series of reflectivity traces may closely match the input traces of the processed seismic data. In one implementation, the matching process for the series of reflectivity traces of the model of the earth and the reflectivity traces of the processed seismic data may be performed using the borehole matching techniques described in step 130. By matching the series of reflectivity traces of the model of the earth with the reflectivity traces of the processed seismic data using the borehole matching techniques, the computer application may receive an estimated wavelet from the borehole matching technique. If the computer application successfully created a series of reflectivity traces of the model of the earth, the estimated wavelet obtained at step 160 may match with the estimated wavelet in the input seismic to borehole data obtained at step 130.

At step 165, the computer application may match the series of reflectivity traces with the measured borehole seismic data. The computer application may match the series of reflectivity traces of the model of the earth to the reflectivity traces of the borehole seismic data to determine how well the reflectivity traces of the model of the earth modeled the reflectivity traces of the borehole seismic data. A good model of the earth may include a series of reflectivity traces that has a zero phase shift from the reflectivity traces measured at each borehole location. Also, a good model of the earth may not include a wavelet therein. In one implementation, the computer application may simultaneously match the series of reflectivity traces of the model of the earth to the reflectivity traces of the borehole seismic data (i.e., step 165) and to the input traces of the processed seismic data (i.e., step 160).

At step 170, the computer application may evaluate the results of the matching between the series of reflectivity traces of the model of the earth and the input traces of the processed seismic data (i.e., step 160), between the series of reflectivity traces of the model of the earth and the reflectivity traces of the borehole seismic data (i.e., step 165), and between the processed seismic data and the measured borehole seismic data (i.e., step 130). In this manner, method 100 may quantify the quality of the seismic inversion using the results of comparing the measured borehole seismic data to the processed seismic data (i.e., step 130), comparing the series of reflectivity traces of the model of the earth to the measured borehole seismic data, and comparing the series of reflectivity traces of the model of the earth to the input traces of the processed seismic data. In one implementation, the computer application may make each comparison described above for each trace and at each borehole location. The computer application may use these comparisons to establish a three way tie between the processed seismic data, the measured borehole seismic data and the inverted seismic data. In this manner, the computer application may determine the established quality attributes for the seismic inversion of the processed seismic data.

In one implementation, the computer application may evaluate the above comparisons using plots, quantification algorithms or the like. For instance, the computer application may quantify the above comparisons by measuring the similarity between the series of reflectivity traces and the input traces of the processed seismic data or the traces in the measured borehole seismic data using a measure like predictability. Predictability values may range from 0 to 100, where 100 represents a perfect match. In one implementation, the predictability value may be a global value that is used to measure the overall quality of the match. In another implementation, the predictability value may be a frequency dependent measure which shows the predictability value for the match at each frequency (see FIGS. 2-3). The computer application may evaluate the matchings based on its predictability values over a wide range of frequencies and more consistent values when measured on a trace by trace basis.

The computer application may output the results of the evaluation to a display or store the results to a memory device. The evaluation of the results of the matching between the series of reflectivity traces of the model of the earth and the input traces of the processed seismic data (i.e., step 160), between the series of reflectivity traces of the model of the earth and the reflectivity traces of the borehole seismic data (i.e., step 165), and between the processed seismic data and the measured borehole seismic data (i.e., step 130) may be illustrated in FIGS. 2 and 3.

At step 180, the computer application may determine whether the seismic inversion has been optimized. If the computer application determines that the seismic inversion has not been optimized, the computer application may proceed to step 190. In one implementation, the computer application may determine whether the seismic inversion has been optimized by comparing the evaluated results of the current seismic inversion received at step 170 to a previous seismic inversion performed on the same processed seismic data. For example, if the difference between the evaluated results of the current seismic inversion and the evaluated results of a previous seismic inversion is less than a predetermined value, the computer application may determine that the seismic inversion has been optimized. Initially, the computer application may not have performed a previous seismic inversion. In this case, the computer application may determine that that the seismic inversion has not been optimized. If the computer application determines that the seismic inversion has been optimized, the computer application may then end method 100. In one implementation, determining whether the seismic inversion has been optimized may also be achieved based on a visual inspection of the quantified results after each step of method 100.

At step 190, the computer application may optimize the seismic inversion of the processed seismic data. In one implementation, the computer application may optimize the seismic inversion of the processed seismic data by modifying one or more inversion parameters in the inversion algorithm used for the seismic inversion at step 130. In another implementation, the computer application may optimize the seismic inversion of the processed seismic data by modifying parameters in the seismic data processing pre-conditioning algorithms described at step 120. In yet another implementation, computer application may optimize the seismic inversion of the processed seismic data by modifying parameters in the measured borehole seismic data conditioning processes.

After the computer application optimizes the seismic inversion of the processed seismic data, the computer application may repeat steps 120-190 until the results have been optimized. As such, the computer application may continually modify parameters in the seismic inversion process or the seismic data processing process of method 100 until the seismic inversion has been optimized.

Although method 100 has been described as determining the quality of a seismic inversion with respect to the inversion of processed seismic data, it should be noted that in other implementations method 100 may be used to determine the quality of a seismic inversion with respect to the inversion of VSPs and other types of seismic data.

Figure 2:
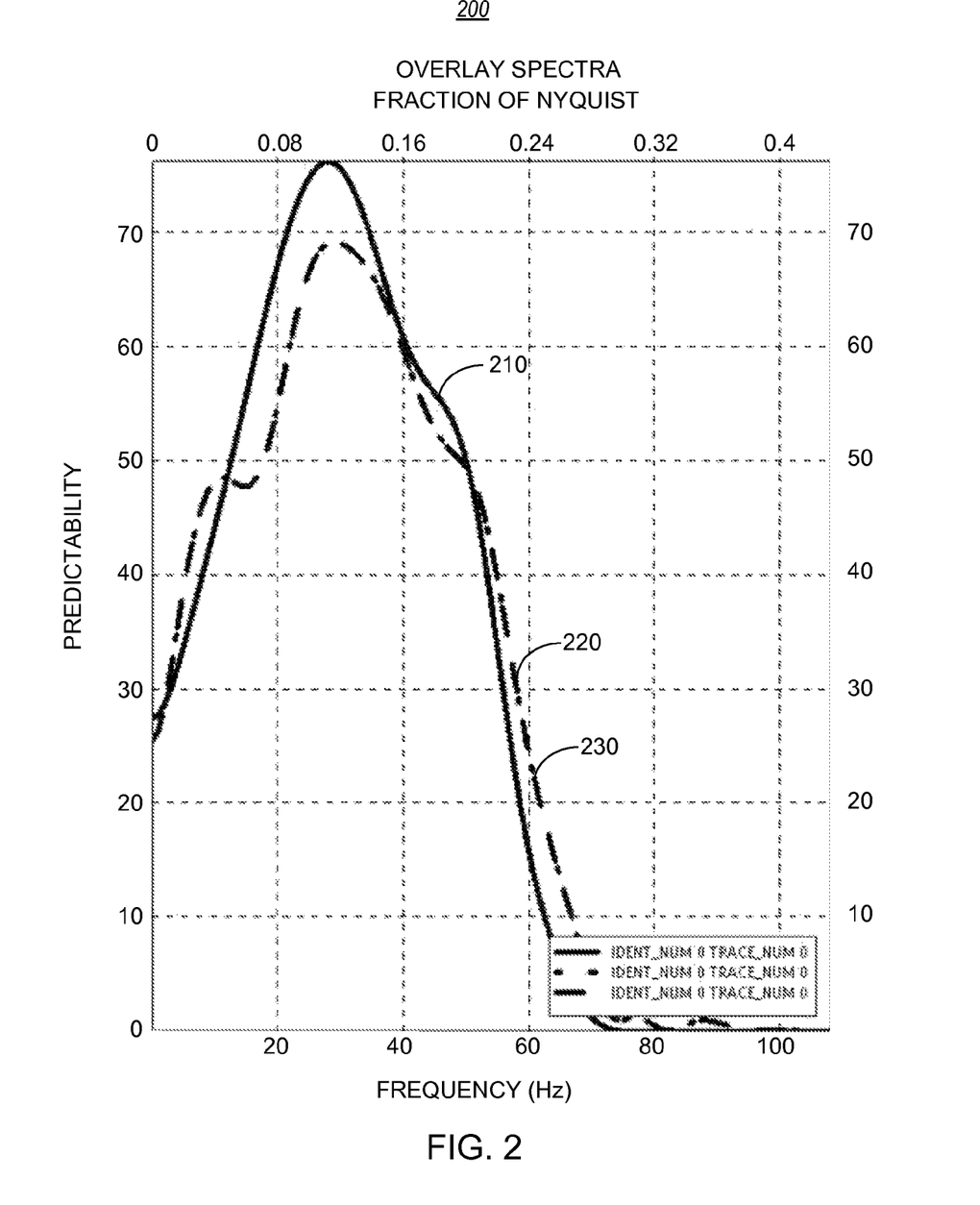
FIG. 2 illustrates frequency dependent predictability curves for three different seismic data sets.

FIG. 2 illustrates frequency dependent predictability curves for three different seismic data sets. The relationship between the predictability and the frequency for the different seismic inversion data sets are illustrated with curve 210, curve 220 and curve 230. Each curve has been generated based on the same acquired seismic data. However, each curve represents a different method of conditioning the seismic data. Since curve 220 and curve 230 have the same predictability versus frequency relationship, the seismic data set that corresponds to each of these curves have been conditioned similarly. FIG. 2 indicates the quality of the initial match between the processed seismic data and the measured borehole seismic data (i.e., step 130) at each frequency before performing the seismic inversion. As shown in FIG. 2, the method represented by curve 210 is generally more predictable at 30 Hz than the methods represented by curve 220 and curve 230.

Figure 3:
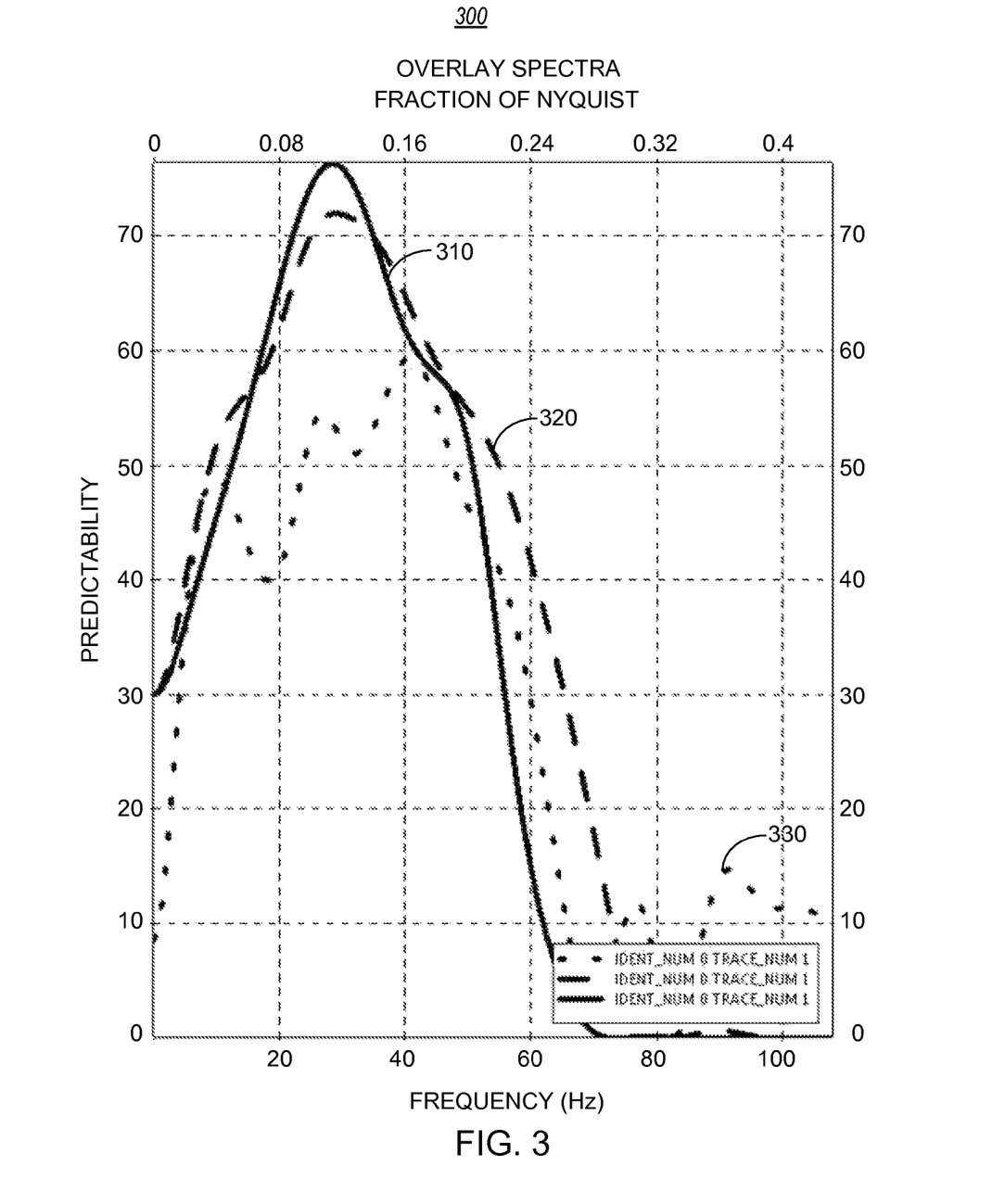
FIG. 3 illustrates frequency dependent predictability curves for three different seismic inversion processes generated in accordance with one or more implementations of various techniques described herein.

FIG. 3 illustrates frequency dependent predictability curves for three different seismic datasets in accordance with one or more implementations of various technologies described herein. Like FIG. 2, the relationship between the predictability and the frequency for the different seismic datasets are illustrated with curve 310, curve 320 and curve 330. The seismic datasets illustrated with curve 310, curve 320 and curve 330 correspond to the seismic datasets illustrated with curve 210, curve 220 and curve 230, respectively. However, each curve in FIG. 3 represents a seismic dataset that has been obtained using a different seismic inversion process. Therefore, each curve in FIG. 3 indicates the quality of the reflectivity model based on the measured borehole seismic data after performing the seismic inversion.

As shown in FIG. 3, when comparing each trace in the series of reflectivity traces with the input traces of the processed seismic data and the reflectivity traces of the measured borehole seismic data (i.e., step 170), the computer application may build more detailed results as compared to the prior art techniques illustrated in FIG. 2. Like the curves in FIG. 2, each curve in FIG. 3 represents a different method of processing the acquired seismic data including applying different seismic processing parameters (i.e., step 120), different seismic inversion methodologies/processes (i.e., step 140) and the like. The curves in FIG. 3, however, include more detailed information about the predictability of each curve as compared to the curve in FIG. 2. For instance, according to FIG. 2, the seismic inversion processes that correspond to curve 220 and curve 230 have the same predictability versus frequency characteristics. However, according to FIG. 3, the seismic inversion processes that correspond to curve 220 and curve 230 (i.e., curve 310 and curve 320, respectively) have different predictability versus frequency characteristics. As such, by using method 100, the computer application may generate the curves illustrated in FIG. 3 which may be used to determine which seismic inversion process has a higher predictability within the seismic bandwidth and a higher global predictability value. By using the matches between the series of reflectivity traces to the input traces of the processed seismic data and the reflectivity traces of the measured borehole seismic data, the computer application indicates that the seismic inversion process that corresponds to curve 320 is generally more predictable than the seismic inversion process that corresponds to curve 330 over the bandwidth of 0-70 Hz.

Figure 4:
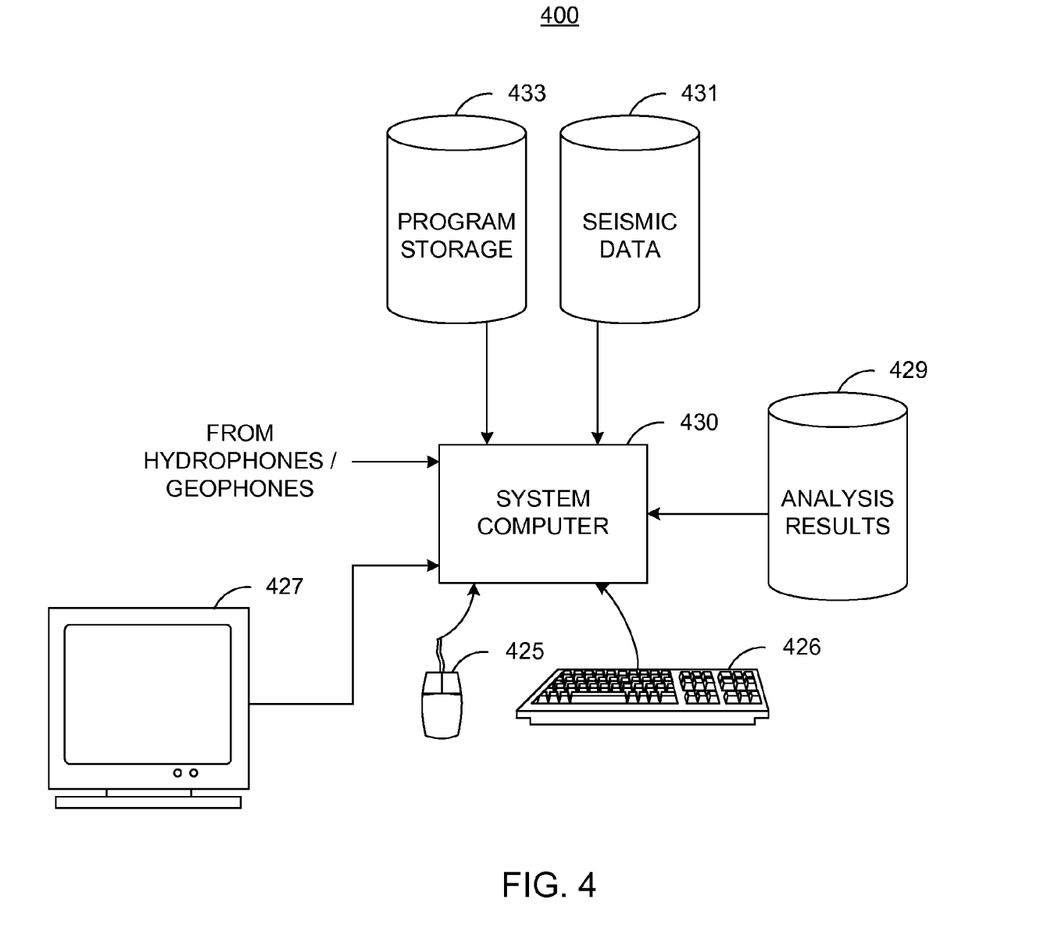
FIG. 4 illustrates a computer network into which implementations of various technologies described herein may be implemented.

FIG. 4 illustrates a computer network 400 into which implementations of various technologies described herein may be implemented. In one implementation, various techniques for determining the quality of a seismic inversion as described in FIG. 1 may be performed on the computer network 400. The computer network 400 may include a system computer 430, which may be implemented as any conventional personal computer or server. However, it should be understood that implementations of various technologies described herein may be practiced in other computer system configurations, including hypertext transfer protocol (HTTP) servers, hand-held devices, multiprocessor systems, microprocessor-based or programmable consumer electronics, network PCs, minicomputers, mainframe computers, high-performance clusters of computers, co-processing-based systems (GPUs, FPGAs) and the like. In one implementation, the computer application described in the method 100 may be stored on the system computer 430.

The system computer 430 may be in communication with disk storage devices 429, 431, and 433, which may be external hard disk storage devices. It is contemplated that disk storage devices 429, 431, and 433 are conventional hard disk drives, and as such, will be implemented by way of a local area network or by remote access. Of course, while disk storage devices 429, 431, and 433 are illustrated as separate devices, a single disk storage device may be used to store any and all of the program instructions, measurement data, and results as desired.

In one implementation, seismic data from the receivers may be stored in disk storage device 431. The system computer 430 may retrieve the appropriate data from the disk storage device 431 to process seismic data according to program instructions that correspond to implementations of various technologies described herein. Seismic data may include pressure and particle velocity data. The program instructions may be written in a computer programming language, such as C++, Java and the like. The program instructions may be stored in a computer-readable memory, such as program disk storage device 433. Such computer-readable media may include computer storage media and communication media.

Computer storage media may include volatile and non-volatile, and removable and non-removable media implemented in any method or technology for storage of information, such as computer-readable instructions, data structures, program modules or other data. Computer storage media may further include RAM, ROM, erasable programmable read-only memory (EPROM), electrically erasable programmable read-only memory (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computing system 400.

Communication media may embody computer readable instructions, data structures or other program modules. By way of example, and not limitation, communication media may include wired media such as a wired network or direct-wired connection, and wireless media such as acoustic, RF, infrared and other wireless media. Combinations of the any of the above may also be included within the scope of computer readable media.

In one implementation, the system computer 430 may present output primarily onto graphics display 427. The system computer 430 may store the results of the methods described above on disk storage 429, for later use and further analysis. The keyboard 426 and the pointing device (e.g., a mouse, trackball, or the like) 425 may be provided with the system computer 430 to enable interactive operation.

The system computer 430 may be located at a data center remote from the survey region. The system computer 430 may be in communication with the receivers (either directly or via a recording unit, not shown), to receive signals indicative of the reflected seismic energy. After conventional formatting and other initial processing, these signals may be stored by the system computer 430 as digital data in the disk storage 431 for subsequent retrieval and processing in the manner described above. In one implementation, these signals and data may be sent to the system computer 430 directly from sensors, such as geophones, hydrophones and the like. When receiving data directly from the sensors, the system computer 430 may be described as part of an in-field data processing system. In another implementation, the system computer 430 may process seismic data already stored in the disk storage 431. When processing data stored in the disk storage 431, the system computer 430 may be described as part of a remote data processing center, separate from data acquisition. The system computer 430 may be configured to process data as part of the in-field data processing system, the remote data processing system or a combination thereof. While FIG. 4 illustrates the disk storage 431 as directly connected to the system computer 430, it is also contemplated that the disk storage device 431 may be accessible through a local area network or by remote access. Furthermore, while disk storage devices 429, 431 are illustrated as separate devices for storing input seismic data and analysis results, the disk storage devices 429, 431 may be implemented within a single disk drive (either together with or separately from program disk storage device 433), or in any other conventional manner as will be fully understood by one of skill in the art having reference to this specification.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for evaluating a quality of a seismic inversion, comprising:
 (a) performing a first match between seismic data and borehole seismic data at one or more borehole locations to generate an estimate of a wavelet in the seismic data;
 (b) performing, using a microprocessor, the seismic inversion on the seismic data using the estimate of the wavelet to generate inverted seismic data;
 (c) converting the inverted seismic data into one or more reflectivity traces;
 (d) performing a second match between the one or more reflectivity traces and one or more traces in the seismic data;
 (e) performing a third match between the one or more reflectivity traces and one or more traces in the borehole seismic data that is used to generate the estimate of the wavelet; and
 (f) determining the quality of the seismic inversion based on the first match, the second match, the third match or combinations thereof.

2. The method of claim 1, wherein the first match is performed using a borehole matching technique.

3. The method of claim 1, wherein the seismic data is processed in preparation for the seismic inversion.

4. The method of claim 3, further comprising optimizing the seismic inversion based on the quality of the seismic inversion by:
 modifying one or more processing parameters used when the seismic data is processed;
 modifying one or more inversion parameters in an inversion algorithm used in the seismic inversion; or
 combinations thereof.

5. The method of claim 4, wherein optimizing the seismic inversion further comprises repeating steps (a)-(f) until the quality of the seismic inversion is above a predetermined value.

6. The method of claim 3, wherein the processed seismic data is a migrated dataset of seismic data in the time domain or in the depth domain.

7. The method of claim 3, wherein the processed seismic data is pre-stack seismic data or post-stack seismic data.

8. The method of claim 1, wherein the borehole seismic data is acquired from one or more well logging devices or obtained from one or more vertical seismic profiles.

9. The method of claim 1, wherein the seismic inversion removes one or more effects of the estimate of the wavelet from the seismic data to create a model of one or more rock properties of the earth.

10. The method of claim 1, wherein the one or more reflectivity traces are impedance traces, density traces, velocity traces, or combinations thereof.

11. The method of claim 1, wherein performing the seismic inversion comprises adding a low frequency model for one or more properties of the earth derived from the seismic inversion.

12. The method of claim 1, wherein the second match determines how well the estimate of the wavelet was removed from the one or more reflectivity traces on a trace by trace basis.

13. The method of claim 1, wherein the third match determines how well the one or more reflectivity traces modeled the one or more traces of the borehole seismic data.

14. The method of claim 1, wherein the quality of the seismic inversion is determined by comparing the first match, second match and third match using plots, quantification algorithms or combinations thereof.

15. The method of claim 1, further comprising optimizing the seismic inversion based on the quality of the seismic inversion, wherein optimizing the seismic inversion comprises modifying one or more inversion parameters in an inversion algorithm used in the seismic inversion.

16. The method of claim 1, further comprising:
optimizing the seismic inversion to generate optimized inverted seismic data based on a comparison between the quality of the seismic inversion and a quality of a previously performed seismic inversion, wherein the previously performed seismic inversion was performed on the seismic data using one or more different parameters than what were used for the seismic inversion; and
estimating hydrocarbon reserves based on the optimized inverted seismic data.

17. The method of claim 1, further comprising determining the quality of the Seismic inversion based on the first match, the second match, and the third match.

18. A method for evaluating a quality of a seismic inversion, comprising:
processing seismic data in preparation for the seismic inversion;
performing a first match between the processed seismic data and borehole seismic data at one or more borehole locations to estimate one or more wavelets that are embedded in the processed seismic data;
performing, using a microprocessor, the seismic inversion on the seismic data using the wavelets to generate inverted seismic data;
converting the inverted seismic data into one or more reflectivity traces;
performing a second match between the one or more reflectivity traces and one or more traces in the seismic data;
performing a third match between the one or more reflectivity traces and one or more traces in the borehole seismic data that is used to generate the estimate of the wavelet; and
determining the quality of the seismic inversion based on the first match, the second match, the third match or combinations thereof.

19. The method of claim 18, wherein performing the seismic inversion comprises determining a single wavelet from the wavelets.

20. The method of claim 18, wherein performing the seismic inversion comprises removing a varying phase in the wavelets such that the wavelets are the same zero phase wavelet.

21. The method of claim 18, further comprising optimizing the seismic inversion based on the quality of the seismic inversion, wherein optimizing the seismic inversion comprises modifying one or more inversion parameters in an inversion algorithm used in the seismic inversion.

* * * * *